UNITED STATES PATENT OFFICE 2,261,176

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 1, 1939, Serial No. 282,527

8 Claims. (Cl. 260—155)

This invention relates to the art of dyeing or coloring. More particularly, it relates to arylazo dye compounds and the application of the nuclear non-sulfonated arylazo dye compounds for the coloration of organic derivatives of cellulose, particularly textile materials made of or containing an organic derivative of cellulose by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The arylazo dye compounds of our invention have the general formula:

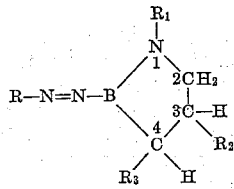

wherein R represents the residue of a member selected from the group consisting of a benzene nucleus, a naphthalene nucleus and an azobenzene nucleus, B represents the residue of a benzene nucleus, $R_1$ represents a member selected from the group consisting of hydrogen and an alkyl group, $R_2$ and $R_3$ each represents a member selected from the group consisting of hydrogen, an alkyl group and an amino group, wherein each of the hydrogen atoms shown attached to the carbon atoms numbered 2, 3 and 4 can be replaced by an alkyl group and wherein the nitrogen atom numbered 1 and the carbon atom numbered 4 are joined to said benzene nucleus B in para and meta position, respectively, to the azo group shown. Advantageously, R is the residue of a benzene nucleus.

It will be understood that alkyl, as used herein, unless otherwise stated, includes not only unsubstituted alkyl groups, such as a methyl group, an ethyl group, or a propyl group, but also substituted alkyl groups such as β-hydroxyethyl, β-hydroxypropyl, β,γ-hydroxypropyl, β-methoxyethyl or β-ethoxyethyl, for example. It will also be understood that the benzene, naphthalene and azobenzene nuclei, referred to above, can be substituted. This will be apparent from the examples which follow hereinafter. These nuclei can be substituted, for example, with a substituent such as a nitro group, a halogen atom, an alkyl group, a hydroxy group, or an alkoxy group. Illustrative of halogen may be mentioned chlorine, bromine and iodine. Similarly, illustrative of alkoxy may be mentioned methoxy, ethoxy, propoxy, butoxy, β-methoxyethoxy and β-ethoxyethoxy.

The azo dye compounds of our invention can be prepared by diazotizing a primary arylamine and coupling the diazonium compound obtained with a coupling component having the general formula:

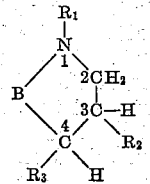

wherein B represents the residue of a benzene nucleus, $R_1$ represents hydrogen or an alkyl group, $R_2$ and $R_3$ each represents hydrogen, an alkyl group or an amino group and wherein each of the hydrogen atoms shown attached to the carbon atoms numbered 2, 3 and 4 can be replaced by an alkyl group.

As previously indicated, the nuclear non-sulfonated arylazo dye compounds of our invention constitute valuable dyes for the coloration of organic derivatives of cellulose, such as those hereinbefore mentioned, yielding various shades thereon of good fastness to light and washing. These nuclear non-sulfonated dye compounds likewise possess some application for the dyeing of wool and silk and yield generally similar shades on these materials as on organic derivatives of cellulose.

Azo compounds having the above general formula containing a nuclear sulfonic acid group can likewise be prepared in known fashion. Such compounds may be prepared by sulfonation of the unsulfonated azo dye compounds or by prior sulfonation of the intermediates employed. These nuclear sulfonated compounds possess little or no utility for the coloration of organic derivatives of cellulose but can be employed to color textile materials such as wool and silk yielding generally similar shades as the corresponding non-sulfonated compounds. Accordingly, when the azo compounds of our invention are employed for the dyeing of organic derivatives of cellulose, they should not contain a nuclear sulfonic acid group. Again, it is generally advantageous when they are to be used for this purpose that they do not contain a free nuclear carboxylic acid group.

We are aware that U. S. Patent No. 2,067,726, issued January 12, 1937, describes the preparation of azo dyes obtained by diazotizing a nitroaminobenzene and coupling the diazo compound obtained with a 1,2,3,4-tetrahydroquinoline of the general formula:

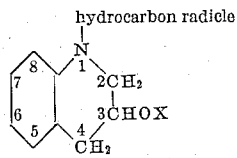

wherein X means hydrogen or alkyl and in which the benzene nucleus may be substituted by alkyl, halogen or alkoxy. These water-insoluble dyes, free from sulfonic- and carboxylic acid groups, are stated to be particularly advantageous for dyeing cellulose esters, especially acetate silk. No claim is made to these dyes.

The azo dye compounds of our invention differ chemically from those just described in that the tetrahydroquinoline coupling component contains no hydroxyl or alkoxy group in the 3-position. Again, generally speaking, the azo dye compounds of our invention possess the advantage of being more readily and economically prepared than those of the character disclosed in Patent No. 2,067,726. In this connection, it will be noted that this patent contains no description of the preparation of the 1,2,3,4-tetrahydroquinoline compounds. However, British Patent No. 458,423, corresponding thereto, states that they can be obtained by condensation of the appropriate alkyl- or aralkylamino benzenes with epichlorhydrin at a raised temperature whereby ring closure occurs with the formation of the tetrahydroquinoline derivative (see page 1, lines 34-41). We have tried several times to prepare these compounds following the directions given for their preparation but have had poor success.

In contrast thereto the new tetrahydroquinoline coupling components of our invention, depending upon their particular structure, can be readily prepared by varying methods which differ from that of British Patent No. 458,423. Tetrahydroquinoline compounds of our invention can be prepared by hydrogenating quinoline or suitable quinoline derivatives in the presence of a catalyst such as Raney nickel. Substituted quinolines can be prepared from the corresponding substituted aniline compounds using the Skraup synthesis. 7-methylquinoline, for example, can be prepared from meta-toluidine using this method. Compounds such as 2,2,4-trimethyltetrahydroquinoline are prepared by reacting aniline or substituted anilines with a ketone such as acetone methylethyl ketone, diethylketone etc., together with a suitable catalyst or catalysts as described in Berichte, vol. 65, page 1511 (1932); Journal American Chemical Society, vol. 55, page 2805 (1933); Berichte, vol. 54, page 1723 (1921) and hydrogenating the dihydro alkyl substituted quinolines thus formed.

The dye compounds of our invention, in general, yield dyeings on organic derivatives of cellulose, especially cellulose acetate silk, of good fastness to light and washing. Further, the dye compounds of our invention possess good affinity for cellulose acetate silk fibers and dye this material rapidly at temperatures as low as 60-65° C. This property of rapid dyeing at low temperatures is of advantage in that it eliminates the necessity of dyeing at higher temperatures and thereby lessens the danger of damaging the fiber.

Again, as is well known in the art, there has been difficulty in securing dischargeable blue dyes for cellulose acetate. In addition to the difficulty of obtaining a dischargeable blue dye, there is the further difficulty of obtaining one which is both stable to light and resistant to acid fading. We have discovered that certain of the dye compounds of our invention yield blue dyeings on cellulose acetate silk which are dischargeable, fast to light and very resistant to acid fading. The dyes having these properties can, for the most part, be represented by the general formula:

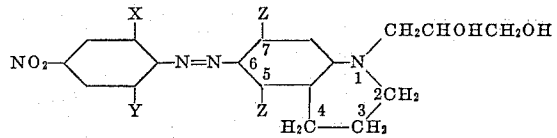

wherein X represents a member selected from the group consisting of hydrogen, chlorine and bromine, Y represents a member selected from the group consisting of hydrogen and a nitro group, and Z represents a member selected from the group consisting of hydrogen and methyl, said compounds being further characterized in that X and Y cannot both be hydrogen at the same time. Special claim is laid to these dyes because of their unusually excellent properties which could not be foreseen.

The following examples illustrate the preparation of the azo dye compounds of our invention:

*Example 1*

13.5 grams of p-aminoacetophenone are dissolved in 200 cc. of water containing 25 cc. of 36% hydrochloric acid. The resulting solution is cooled to a temperature approximating 0-5° C. and the amine is diazotized at this temperature by adding with stirring a water solution of 6.9 grams of sodium nitrite.

13.3 grams of tetrahydroquinoline are dissolved in 100 cc. of water containing 10 cc. of 36% hydrochloric acid. The resulting solution is cooled to a temperature approximating 0–10° C. and the diazo solution prepared as described above is added with stirring. The coupling reaction which takes place is completed by adding sodium acetate. The dye compound formed is recovered by filtration, washed with water and dried. This dye compound colors cellulose acetate silk an orange shade.

*Example 2*

17.3 grams of 1-amino-2-chloro-4-nitrobenzene are diazotized in known fashion and the diazonium compound obtained is coupled in a cold aqueous hydrochloric acid solution with 17.7 grams of 1-β-hydroxyethyltetrahydroquinoline. Coupling and recovery of the dye compound may be carried out as described in Example 1. The dye compound obtained colors cellulose acetate silk a rubine shade.

*Example 3*

18.3 grams of 1-amino-2,4-dinitrobenzene are diazotized and the diazonium compound obtained is coupled with 20.5 grams of 1-glyceryltetrahydroquinoline. Coupling and recovery of the dye compound may be carried out as described in Example 1. The dye compound obtained colors cellulose acetate silk a violet shade.

*Example 4*

21.8 grams of 1-amino-2,4-dinitro-6-chlorobenzene are diazotized and the diazonium compound obtained is coupled with 21 grams of 1-glyceryl-7-methyltetrahydroquinoline. The dye compound obtained colors cellulose acetate silk a blue shade.

*Example 5*

26.3 grams of 1-amino-2,4-dinitro-6-bromobenzene are diazotized and the diazonium compound obtained is coupled with 24 grams of 1-β-hydroxy-γ-chloropropyl-7-methyltetrahydroquinoline. Coupling and recovery of the dye compound may be carried out as described in Example 1. The dye compound obtained colors cellulose acetate silk a blue shade.

*Example 6*

30.9 grams of 1-amino-2,4-dinitro-6-fluorobenzene are diazotized and the diazonium compound obtained is coupled with 31.2 grams of

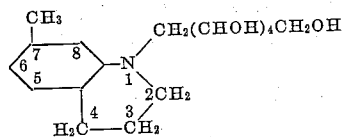

The dye compound obtained colors cellulose acetate silk a blue shade.

*Example 7*

25.2 grams of 1-amino-2,4-dinitro-3,6-dichlorobenzene are diazotized and the diazonium compound obtained is coupled with 19.1 grams of 1-γ-hydroxypropyl-5-methyltetrahydroquinoline. The dye compound obtained colors cellulose acetate silk a blue shade.

*Example 8*

7.2 grams of sodium nitrite are dissolved in 50 cc. of warm sulfuric acid (100%) following which the solution resulting is cooled to room temperature.

22.8 grams of picramide are pulverized and added to the solution prepared above and the mixture resulting is stirred for 40 hours at 35–40° C. 27 grams of

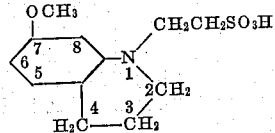

are dissolved in sulfuric acid at 0–10° C. and the diazo solution prepared above is slowly added with stirring. The coupling reaction which takes place is carried out while maintaining a temperature approximating 0–10° C. Upon completion of the coupling reaction, the dye compound formed is salted out by the addition of sodium chloride and recovered by filtration. The dye compound obtained colors cellulose acetate silk a blue shade.

*Example 9*

15.4 grams of 1-amino-2-hydroxy-5-nitrobenzene are diazotized and the diazonium compound obtained is coupled with an equivalent gram molecular weight of 1-β-methoxyethyl-2,2,4-trimethyl-8-chlorotetrahydroquinoline. The dye compound obtained colors cellulose acetate silk a magenta shade.

*Example 10*

1 gram mole of 1-amino-2,4-dinitro-6-chlorobenzene are diazotized and the diazonium compound obtained is coupled with 1 gram mole of 1-methyl-4-di-β-hydroxyethylamino-8-methyltetrahydroquinoline. Coupling and recovery of the dye compound formed may be carried out in accordance with the general method described in Example 1. The dye compound obtained, which has the formula:

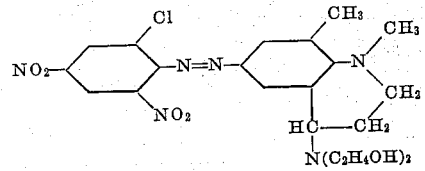

colors cellulose acetate silk a blue shade.

*Example 11*

1 gram mole of 1-amino-2,4-dinitro-6-cyanobenzene is diazotized and the diazonium compound obtained is added with stirring to an iced hydrochloric acid solution of 1-β-hydroxy-β-ethoxy-ethyl-3-acetamino-8-methyltetrahydroquinoline. Sodium acetate is added until the mixture resulting no longer turns Congo red paper blue. Upon completion of the coupling reaction which takes place, the dye compound is recovered by filtration, washed and dried. The dye compound obtained, which has the formula:

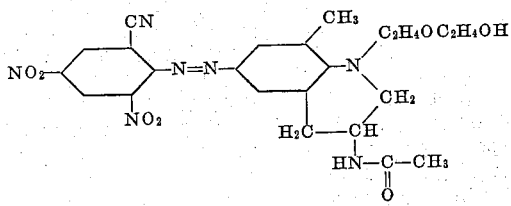

colors cellulose acetate silk reddish blue shades.

For purposes of clarity, it is here noted that the numbering of the tetrahydroquinoline nucleus employed herein is that given in Examples 6 and 8, for example.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated in Examples 1 to 11, inclusive.

| Amine | Coupling component | Color on cellulose acetate silk |
|---|---|---|
| p-Aminoacetophenone | (1) 7-chlorotetrahydroquinoline | Yellow-orange. |
| Do | (2) 8-methoxytetrahydroquinoline | Do. |
| Do | (3) 1-methyl-7-chlorotetrahydroquinoline | Do. |
| Do | (4) 2, 2, 4-trimethyltetrahydroquinoline | Do. |
| Do | (5) 1-β-hydroxyethyltetrahydroquinoline | Orange. |
| Do | (6) 1-β-hydroxyethyl-2, 2, 4-trimethyltetrahydroquinoline | Do. |
| Do | (7) 1-γ-hydroxypropyltetrahydroquinoline | Do. |
| Do | (8) 1-glyceryltetrahydroquinoline | Do. |
| Do | (9) 1-γ-methoxy-β-hydroxypropyltetrahydroquinoline | Do. |
| Do | (10) 1-γ-chloro-β-hydroxypropyltetrahydroquinoline | Do. |
| Do | (11) 1-β-sulfatoethyltetrahydroquinoline | Do. |
| Do | (12) 1-sulfoethyltetrahydroquinoline | Do. |
| Do | (13) 1-β-methoxyethyl-8-methyltetrahydroquinoline | Do. |
| Do | (14) 1-β-hydroxypropyl-7-methyltetrahydroquinoline | Do. |
| Do | (15) 1-glyceryl-5-methyltetrahydroquinoline | Do. |
| Do | (16) 1-γ-hydroxypropyl-7-methyltetrahydroquinoline | Do. |
| Do | (17) 1-γ-chloro-β-hydroxypropyl-7- methyltetrahydroquinoline. | Do. |
| Do | (18) 1-glyceryl-2, 2, 4-trimethyl-7-methoxytetrahydroquinoline. | Do. |
| Do | (19) 1-glyceryl-2, 2, 4-trimethyl-5, 8-dimethoxytetrahydroquinoline. | Do. |
| p-Nitroaniline | Components 1–19 above | Orange to rubine. |
| 1-amino-2-(Cl, Br, F)-4-nitrobenzene | do | Orange to rubine. |
| 1-amino-3-(Cl, Br, F)-4-nitrobenzene | do | Orange to violet. |
| 1-amino-2,5-di-(Cl, Br, F)-4-nitrobenzene | do | Orange to rubine. |
| 1-amino-2-hydroxy-4-nitrobenzene | do | Orange to violet. |
| 1-amino-2-hydroxy-4-nitro-6-(Br, Cl)-benzene | do | Orange-pink-rubine. |
| p-Aminoazobenzene | do | Orange-pink-violet. |
| 1-amino-2, 4-dinitrobenzene | do | Orange to red. |
| 1-amino-2, 4-dinitro-6-(Br, Cl, F)-benzene | do | Red to purple. |
| 1-amino-2, 4-dinitro-6-cyano-benzene | do | Red to blue. |
| 2-amino-3, 5-dinitrophenylmethylsulfone | do | Do. |
| 1-amino-2, 4-dinitronaphthalene | do | Do. |
| 1-amino-2-chloro-4-nitrobenzene | 1-ethyl-4-aminotetrahydroquinoline | Red to blue-green. |
| Do | 2-ethyltetrahydroquinoline | Rubine. |
| Do | 4-methylaminotetrahydroquinoline | Do. |
|  |  | Do. |

It will be understood from the foregoing that the amino group which can be present in the 3 or 4 position of the tetrahydroquinoline nucleus can be unsubstituted or substituted. The amino group can, for example, be substituted with an alkyl group or an acyl group such as

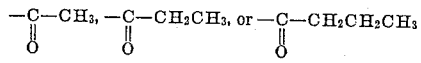

for example. The term amino, accordingly, as used herein and in the claims in connection with the amino group which can be present in the 3 or 4 position of the tetrahydroquinoline nucleus includes the unsubstituted amino group as well as substituted amino groups.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The nuclear non-sulfonated azo dye compounds having the general formula:

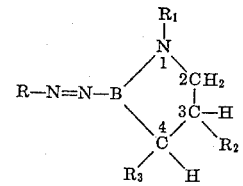

wherein R represents the residue of a benzene nucleus, B represents the residue of a benzene nucleus, $R_1$ represents a hydroxyalkyl alkyl group, $R_2$ and $R_3$ each represents a member selected from the group consisting of hydrogen, an alkyl group and an amino group, wherein each of the hydrogen atoms shown attached to the carbon atoms numbered 2, 3 and 4 can be replaced by an alkyl group and wherein the nitrogen atom numbered 1 and the carbon atom numbered 4 are joined to said benzene nucleus B in para and meta position, respectively, to the azo group shown.

2. The nuclear non-sulfonated azo dye compounds having the general formula:

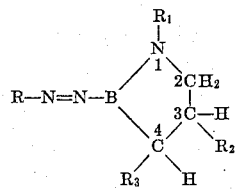

wherein R represents the residue of a benzene nucleus containing a nitro group, B represents the residue of a benzene nucleus, R₁ represents a hydroxyalkyl group, R₂ and R₃ each represents a member selected from the group consisting of hydrogen, an alkyl group and an amino group, wherein each of the hydrogen atoms shown attached to the carbon atoms numbered 2, 3 and 4 can be replaced by an alkyl group and wherein the nitrogen atom numbered 1 and the carbon atom numbered 4 are joined to said benzene nucleus B in para and meta position, respectively, to the azo group shown.

3. The azo dye compounds having the nuclear non-sulfonated general formula:

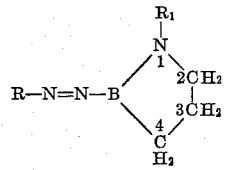

wherein R and B each represents the residue of a benzene nucleus, R₁ represents a hydroxyalkyl group, wherein each of the hydrogen atoms attached to the carbon atoms numbered 2, 3 and 4 can be replaced by an alkyl group and wherein the nitrogen atom numbered 1 and the carbon atom numbered 4 are joined to said benzene nucleus B in para and meta position, respectively, to the azo group shown.

4. The azo dye compounds having the general formula:

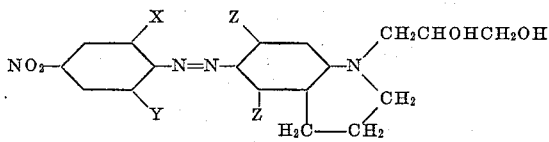

wherein X represents a member selected from the group consisting of hydrogen, chlorine and bromine, Y represents a member selected from the group consisting of hydrogen and a nitro group, and Z represents a member selected from the group consisting of hydrogen and methyl, said compounds being further characterized in that X and Y cannot both be hydrogen at the same time.

5. The azo dye compound having the formula:

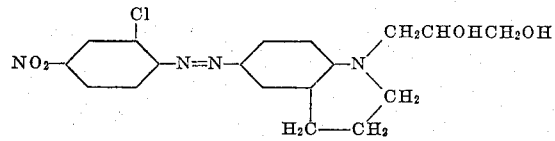

6. The azo dye compound having the formula:

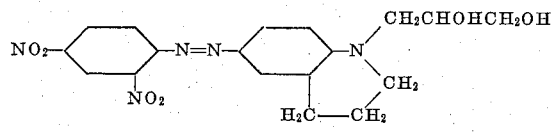

7. The azo dye compound having the formula:

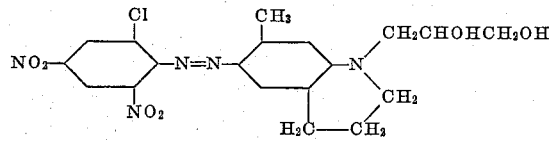

8. A cellulose acetate colored with a nuclear non-sulfonated azo dye compound having the general formula:

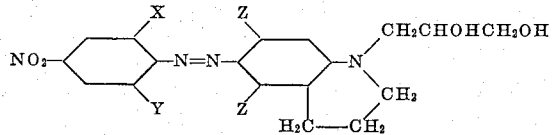

wherein X represents a member selected from the group consisting of hydrogen, chlorine and bromine, Y represents a member selected from the group consisting of hydrogen and a nitro group, and Z represents a member selected from the group consisting of hydrogen and methyl, said compounds being further characterized in that X and Y cannot both be hydrogen at the same time.

JAMES G. McNALLY.
JOSEPH B. DICKEY.

CERTIFICATE OF CORRECTION.

Patent No. 2,261,176.  November 4, 1941.

JAMES G. McNALLY, ET AL.

It is hereby certified that error appears in the printed specification of the above numbered patent requiring correction as follows: Page 5, first column, lines 24 and 25, claim 3, for "The azo dye compounds having the nuclear non-sulfonated" read --The nuclear non-sulfonated azo dye compounds having the--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.